Feb. 5, 1946.  G. B. SHERMAN  2,394,210
COUPLING MEANS FOR TRACTORS
Filed June 17, 1942  6 Sheets-Sheet 1

Inventor:
George B. Sherman
By Dawson, Ooms & Borth,
Attorneys.

Patented Feb. 5, 1946

2,394,210

UNITED STATES PATENT OFFICE 2,394,210

COUPLING MEANS FOR TRACTORS

George B. Sherman, Oak Park, Ill., assignor, by mesne assignments, to George B. Sherman, as trustee Application June 17, 1942, Serial No. 447,341

38 Claims. (Cl. 180—14.5)

This invention relates to coupling means for tractors and more particularly to means for connecting a tractor to a load such as an agricultural implement.

When a tractor is connected to an implement or other load by a single angularly movable connection of the conventional type the line of draft passes above the point of engagement of the driving wheels with the ground. This creates a couple on the tractor tending to raise its front end and the safe pulling capacity of the tractor is limited by the weight on its front end balancing this force and by the wheelbase of the tractor. Thus to get high pulling capacity it has been necessary to have a heavy tractor with a long wheel base.

Couplings have been proposed to remedy this condition by providing an effective line of draft originating at a point slightly forward of and below the rear axle of the tractor. Such couplings, however, have created a substantial shifting of the theoretical draft point as the relationship between the tractor and load varies so that the tractor is unstable under varying conditions such as are created by operation on uneven ground. Furthermore, such couplings have tended to remove weight from the driving wheels of the tractor so that the traction of the wheels with the ground is reduced.

The present invention has for one of its principal objects the provision of coupling means which will produce stability of the tractor under widely varying conditions of operation. In a preferred construction the tractor is connected to the load by vertically spaced parallel links to create a line of force parallel thereto. According to one feature of the invention this line of force may pass through the traction point of the tractor to maintain complete stability or may pass above or below the traction point to cause an effective shifting of weight for optimum traction, depending upon the distribution of weight of the tractor.

Another object of the invention is to provide coupling means which may be used at the rear of a tractor to pull a load or at the front of the tractor to push the load.

Another object of the invention is to provide coupling means having a ground engaging wheel or the like and adapted to be connected to a load through a single draft connection so that the wheel will carry vertical components of the load force and the tractor will remain stable.

Still another object of the invention is to provide coupling means for tractors in which the coupling means is controlled by the load thereon to regulate the elevation of an implement carried thereby. According to one feature the control is operated hydraulically by a pump unit on the coupling means responsive to a force in either direction thereon connected through flexible conduits to a pressure responsive unit on the tractor.

Another object of the invention is to provide coupling means operable hydraulically to raise or lower an implement. Preferably the hydraulic means includes a motor unit on the coupling means flexibly connected to a pump unit on the tractor.

A further object of the invention is to provide coupling means operable hydraulically to raise or lower an implement and controlled hydraulically in response to the load on the coupling in which the hydraulic control is cut off when the hydraulic raising means is operated to raise the implement.

A further object of the invention is to provide coupling means for tractors in which the tractor is de-clutched when the load on the coupling means exceeds a predetermined limit.

A still further object of the invention is to provide coupling means for connection to an implement which may be of small size and light weight and formed for detachable connection to the coupling means.

The above and other objects and advantages of the invention will be more readily apparent from the following description when read in connection with the accompanying drawings, in which.

The coupling means of the present invention may be used with any desired type of tractor but is illustrated applied to a conventional type of tractor having a frame 10 supported on a rear axle 11 carrying driving wheels 12 and on a central front wheel 13. The front wheel is shown as made up of two wheel units lying in an angle to each other better to take the side thrust on the tractor and lying substantially centrally of the front end of the tractor.

The tractor is provided at both its front and rear ends with connecting plates to carry the coupling means. The coupling, as shown, comprises a flat plate member 14 pivotally connected at the lower end to the tractor frame and supported at the upper end by forks 15 straddling the opposite ends of a collar 16 threaded on a shaft 17 supported by spaced lugs 18 on the frame. The shaft 17 may be turned by a crank 19 thereby to shift the upper end of the plate transversely to tilt it about the pivotal connection at its lower end. This adjustment may be utilized to level the implement relative to the tractor so that the implement may be held level even though the tractor is riding with one wheel in a furrow.

Figure 8:
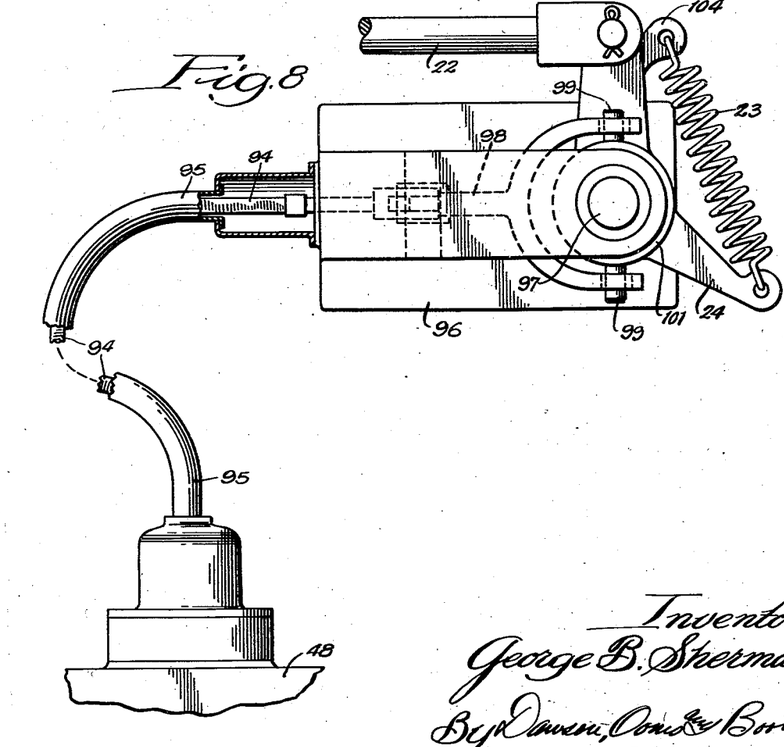
Figure 8 is a side elevation of the clutch release mechanism.

The tractor is provided with the usual engine driving the rear wheels 12 through a clutch mechanism controlled by a throw-out lever 21. The throw-out lever may be connected to the clutch by a link 22 as shown in Figure 8 so that when the lever is moved back the clutch will be engaged, while when the lever is moved forwardly the clutch will be disengaged. A spring 23 is connected to a projection 24 on a collar 25 to which the link 22 is attached for a purpose to appear later. The clutch is held engaged by the usual internal clutch spring and may be disengaged when desired by operation of the lever 21.

The coupling linkage

The tractor is adapted to be connected to an implement or other load to be moved by means of linkage including a head 26 having yokes 27 formed thereon for pivotally connecting the head to bosses 28 on the plate 14 or to similar bosses 28' on the front of the tractor as described hereinafter. The yokes may be connected by means of removable pins 29 for easy attachment and detachment so that the head may be moved from the rear to the front of the tractor as desired or may be entirely removed therefrom. The head 26 carries a cross shaft 31 at its lower portion to the opposite ends of which are connected lower links 32 of equal length and lying in the same plane. The shaft 31 is rotatable in the head to provide a pivotal connection for the links about a horizontal axis. An upper link 33 of the same length as the lower links 32 and lying substantially parallel thereto is pivotally connected to the free end of an arm 34 which is connected to a worm 35 rotatable on a horizontal axis in the head 26.

At their outer ends the links 32 and 33 are pivoted to a frame 36 formed with a substantially flat bottom and having an upstanding arm 37 thereon to the upper end of which the line 33 is connected. It will be noted that the spacing between the pivotal connection of links 32 and 33 on the frame 36 is the same as the spacing between the shaft 31 and the upper end of arm 34 so that the links will be parallel and will remain substantially parallel in all angular positions.

Figures 1, 2:
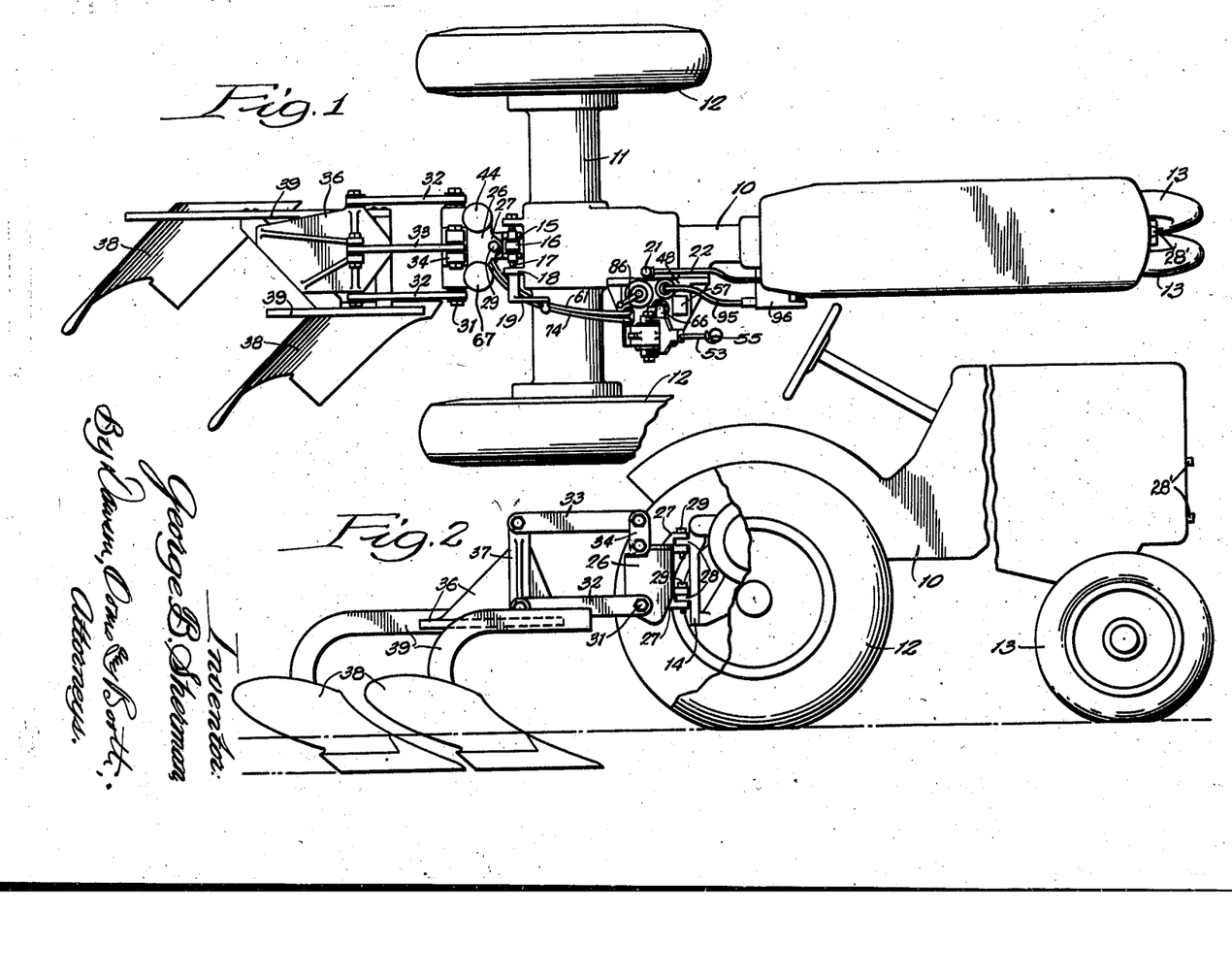
Figure 1 is a top plane view of a tractor having coupling means employing the invention.
Figure 2 is a side elevation with parts broken away.
Figures 3, 4, 5:
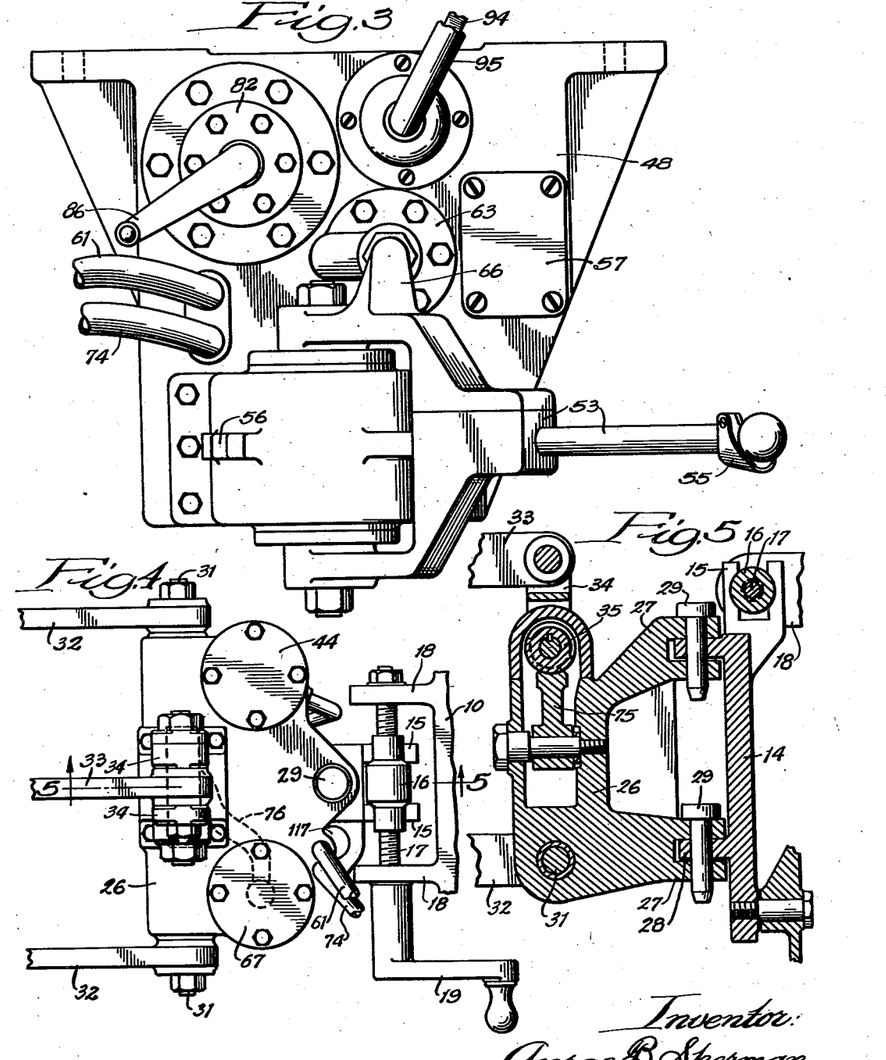
Figure 3 is an enlarged plan view of the control block unit mounted on the tractor.
Figure 4 is an enlarged plan view of the head and connectors on the coupling means.
Figure 5 is a partial section on the line 5—5 of Figure 4.

The frame 36 is adapted to be connected to a load to be moved, such, for example, as the plow shown in Figures 1 and 2. These figures illustrate a double-bottom plow including two plow bases 38 which may be carried directly by frame 36 but which, as shown, are a separate implement frame 39 terminating in a substantially flat top. The implement frame is adapted to be attached to the frame 36 by detachable means more particularly illustrated in Figure 9 as including conical projections 41 on the lower surface of the frame carrying threaded bolts 42 extending downwardly therefrom. The implement frame is formed with conically recessed openings to register with the projections 41 and may be held in place against the projections by nuts 43. The projections serve not only to secure the implement frame securely to the connecting frame but also accurately locate the two frames relative to each other. While one type of implement has been shown in Figures 1 and 2, it will be understood that any other desired type of implement or tool could be attached to the coupling means in the same manner and that the invention is not limited to use with plows.

Implement elevating mechanism

The coupling frame 36 may be raised or lowered to regulate the elevation of the implement by means of a motor mechanism controlled from the tractor. As shown, the motor is of the hydraulic type comprising a cylinder 44 and having a piston 45 slidable therein. The piston is connected by a connecting rod 46 to a crank arm 47 secured to the cross shaft 31 so that when the piston is forced downwardly the cross shaft will be rocked in a direction to elevate the links 32 and thereby to raise the frame 36.

Operating liquid is supplied to the cylinder 44 by a pump suitably secured to the head or to the tractor and shown as carried by a control block 48 secured to the tractor frame. The pump may be any suitable type either manual or power operated, but as shown, comprises a cylinder 49 in the control block having a piston 51 slidable therein to be operated by a crank 52 connected to an operating lever 53. The lever 53 carries a latch 54 controlled by a pivoted finger piece 55 adjacent the outer end of the lever and engageable with the notches 56 on the head of the pump. As shown, only two such notches are provided to latch the lever in either of its extreme positions with the piston at its maximum elevation or at its maximum depression.

Liquid is supplied to the pump from a sump 57 which may be inside the tractor frame or on the head but which is shown in the block 48 through an inlet check valve 58. The outlet of the pump is connected through a check valve 59 and a flexible hose 61 to the top of the cylinder 44. Thus when the pump is operated by oscillating the lever 53, liquid from the sump will be pumped into the cylinder 44 to raise the links 32 and the frame 36. When the piston 45 has been forced downwardly in the cylinder 44 and operation of the pump is stopped, the frame 36 and the implement carried thereby will rest on the head of oil in the cylinder 44 to prevent them from dropping except under the control of the control mechanism to be described hereinafter.

Figure 6:
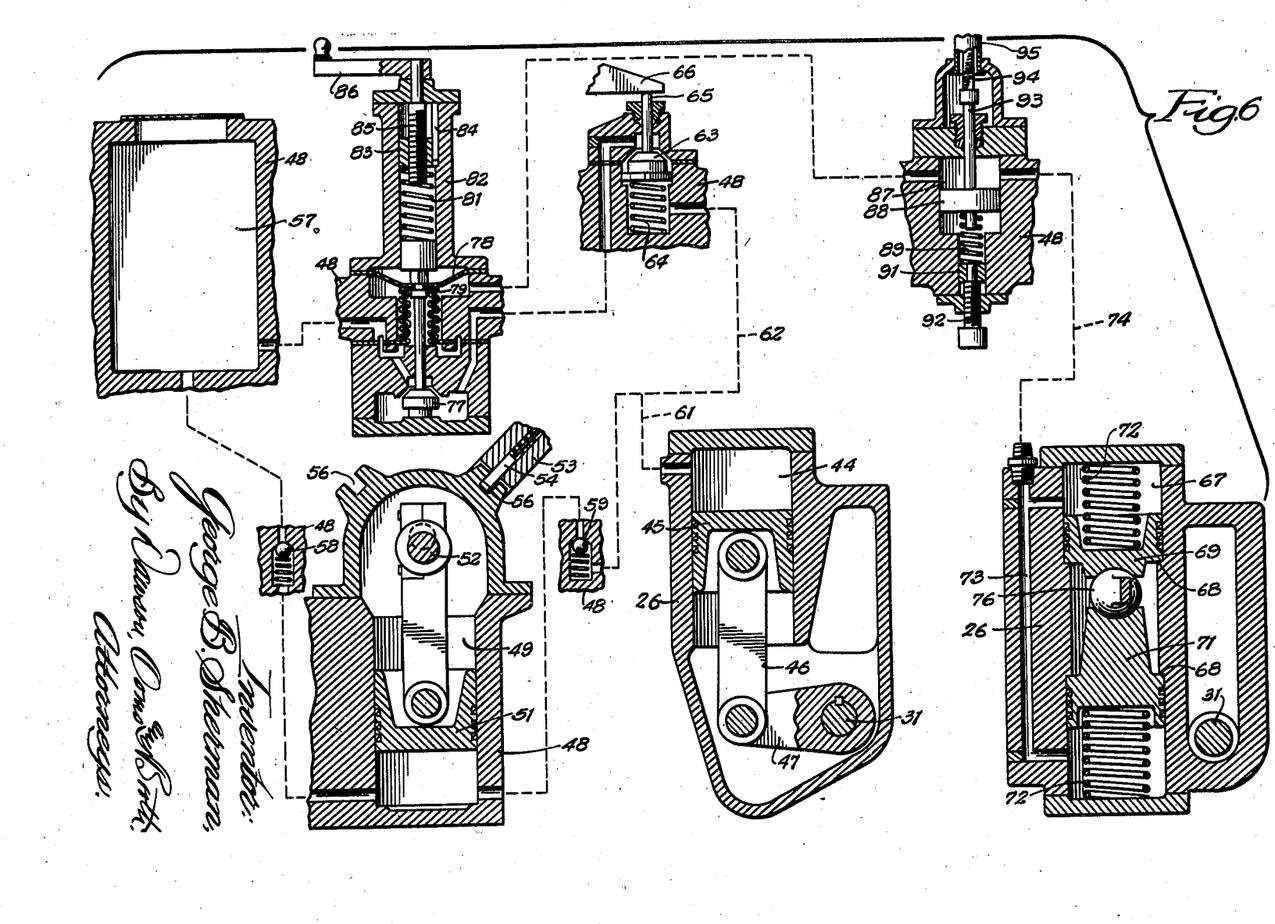
Figure 6 is a diagrammatic view of the hydraulic systems showing the several units in section.

Liquid may be exhausted from the cylinder 44 through the line 61 and through an exhaust passage 62 illustrated diagrammatically in Figure 6 connecting the cylinder to the sump. A cut-off valve is provided in the exhaust passage 62 to prevent the exhaust of any fluid therefrom, for example, when it is desired to raise the implement frame and implement to a carrying position. As shown the cut-off valve comprises a poppet type valve 63 urged to its seat by a spring 64 to close the passage 62. The spring seats against a flange portion on the valve 63 which fits slidably in the valve body and is formed with one or more notches for the passage of fluid. The valve has an elongated stem 65 projecting above the block 48 in a position to be engaged by a finger 66 on the lever 53, when the lever is in its extreme forward position. As soon as the lever is moved from this position, the valve 63 will close to prevent discharge of any liquid from the cylinder 44 through the passage 62.

The load responsive control

Elevation of the frame 36 and of an implement carried thereby are adapted to be controlled in response to the load on the coupling means. For this purpose the head 26 is provided with a second cylindrical bore 67 having outwardly facing shoulders 68 adjacent the opposite ends thereof. Disconnected pistons 69 and 71 are slidable in the bore and are urged to seat against the shoulders by springs 72. The outer ends of the bore 67 are interconnected by a passage 73 which communicates with a flexible hose 74.

The pistons 69 and 71 are adapted to be actuated by pivotal movement of the arm 34 by means of a segment 75 pivoted in the head 26 and meshing with the worm 35. The segment carries an off-set arm 76 extending between the pistons 69 and 71 to move either one or the other outwardly in the cylinder depending on the direction of motion of the segment.

The hose 74 communicates with a pressure responsive control on the block 48 which automatically regulates the discharge through the conduit 62. As shown in Figure 6, the control comprises a poppet valve 77 controlling the passage 62. The valve 77 has a stem connected to a diaphragm 78, the lower surface of which is sealed against communication with the valve chamber by an extensible bellows 79. Thus, the space between the bellows 79 and diaphragm 78 forms a closed chamber communicating with the conduit 74 to elevate the valve 77 upon an increase in pressure. Upward movement of the diaphragm is opposed by a spring 81 mounted in a barrel 82 extending above the diaphragm chamber and slidably carrying a block 83 which bears against the upper end of the spring. The block is held against rotation in the barrel by an elongated key 84 and is adapted to be moved by a threaded shaft 85 threaded into the block 83 and adjustable by a crank 86. By turning the crank 86 the block 83 may be moved up or down, as desired, to vary the tension on the spring 81, thereby to adjust the pressure which must be applied to the diaphragm 78 to close the valve 77.

The safety clutch control

In order to prevent damage to the tractor or to an implement carried thereby, means are provided to disconnect the tractor clutch upon an excessive load. Such means may conveniently be controlled in accordance with the pressure developed in the cylinder 67 and as shown, comprises a cylinder 87 in the block 48 with inlet and outlet ports in its upper end connected to the line 74. A piston 88 is slidable in the cylinder 87 and is urged upwardly by a spring 89 seating against a block 91 whose position is adjustable by a screw 92. The piston 88 is connected through a rod 93 to a flexible cable 94 housed in a flexible sheath 95 to transmit force on the piston to the clutch throw-out mechanism.

Figure 7:
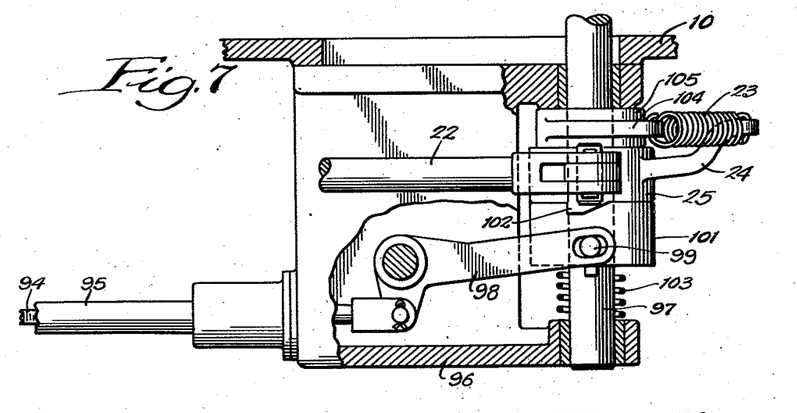
Figure 7 is an enlarged plan view with parts broken away and in section of the clutch release mechanism.

As best seen in Figures 7 and 8, the housing 95 is connected to a casing 96 on the tractor into which the clutch shaft 97 extends. The cable 94 is connected to one arm of a bell crank 98 the other arm of which is yoked and formed with elongated slots receiving radially projecting pins 99 on a collar 101 which is slidably keyed to the clutch shaft 97. The collars 25 and 101 are formed with interengaging cam projections 102 to couple them together so as to connect the collar 25 to the clutch shaft. A spring 103 urges the collars 101 toward the collar 25 to engage the cam projections.

The spring 23 is connected between the projection 24 and an arm 104 on a collar 105 which is keyed to the clutch shaft. When the collar 25 is held in the position shown in Figure 8 by the hand lever, the spring 23 acts on the lever 104 in a direction tending to move the clutch to disengaged position against the action of the usual clutch springs.

Operation

In operation of the unit as so far described, the links and frame 36 will normally occupy approximately the position shown in Figure 2 in which the plow bases 38 enter the ground to the desired depth. Since one of the wheels 12 normally rides in the furrow in the plowing the traction point in the tractor will lie in a line connecting the bottoms of the two wheels which in the center of the tractor will be below the ground level and substantially level with the center of drag on the plow bases 38. With the links 32 and 33 horizontal, the line of draft from the center of draft of the plow bases will extend parallel to the links 32 and 33 through the line of traction of the tractor. Thus the draft force will not interrupt in any way the balance of the tractor.

If desired, according to the invention the linkage may be so proportioned and so mounted as to cause the line of draft from the load to pass either above or below the traction point of the tractor thereby effectively to shift the weight of the tractor either to the front or to the rear thereof. Preferably, if this construction is utilized the linkage and the implement would be so proportioned as to cause the line of draft from the implement to cross the traction point of the tractor slightly above the level of the bottoms of the wheels. If this is done, a couple will be created tending to rock the tractor toward its back wheels thereby increasing the effective weight pressing the wheels on the ground and increasing the traction. It will furthermore be noted that since the plow bases have a tendency to stay in the ground the force created by this tendency of the plow bases as well as by the weight of the links, the frame 36 and the implement will be added to the rear wheels to increase the load thereon so that a greater traction will be obtained.

Shifting of the line of draft as explained above may be regulated for each tractor to obtain the optimum operating conditions so that maximum traction of the driving wheels will be obtained without removing too much weight from the front steering wheels to interfere with proper steering.

In order to insure that the plow bases will be maintained at the proper depth in the ground, the control mechanism will operate to lower the plow as the tractive load thereon is below a predetermined amount. Since the tractive load on the plow bases creates a compressive force on the link 33, this link tends to rock the arm 34 in a clockwise direction to move the worm 35 and segment 75 so that the arm 76 will move one of the pistons 69 or 71. This will create a pressure in the line 74 tending to move the diaphragm 78 upwardly against the spring 81 to close the valve 77. As long as the valve 77 is open, liquid will flow from the cylinder 44 allowing the piston 45 to rise and allowing the links 32 and the frame 36 to drop so that the plow bases may enter the ground further. When the load on the plow bases is sufficient to create a pressure on one of the pistons 69 or 71 great enough to raise the diaphragm 78 to close the valve 77 this movement will be stopped and the implement will be carried by the tractor on the head of oil trapped in the cylinder 44. If at any time the load should decrease the pressure in the diaphragm 78 will be decreased correspondingly to permit the valve 77 to open again until the load again reaches the desired value.

If, during operation, one or both of the plow bases should strike an obstacle such as a large stone or a log, a very heavy load will be placed on the linkage and the piston mechanism will create an extremely high pressure in the line 74. This pressure will act on the piston 88 forcing it downwardly and pulling on the cable 84 to rock the bell crank 98 clockwise as seen in Figure 7. Thus, the collar 101 will be shifted to disengage the cam mechanism 102 and free the shaft 97 from the hand lever 21. At this time the spring 23 will rock the shaft 97 clockwise to release the clutch so that the wheels 12 will be stopped before any damage can be done either to the implement or to the tractor. Upon freeing the plow bases from the obstacle, normal operation may be resumed. To accomplish this, the clutch lever 21 is rocked forwardly to bring its cam projection into register with the cam notch in the collar 101 so that the spring 103 will again move the cam parts into engagement to connect the hand lever to the clutch shaft.

When it is desired to raise the implement either to decrease the furrow depth or remove the plow bases entirely from the ground as for transportation, the pump lever 53 may be operated to force liquid from the pump into the cylinder 44. As soon as the pump lever is released from the forward latch, the finger 66 thereon will disengage the stem 65, allowing the valve 63 to close and closing the discharge line from the motor cylinder 44. By giving the pump lever one or more strokes the implement may be elevated to any desired extent and as long as the lever is in such a position that the finger 66 does not engage the valve stem 65, the implement will remain in elevated position. To hold the implement at the desired depth, as for example in extremely soft ground, the lever may be moved to disengage finger 66 from valve stem 65 so that the implement will be carried on the head of oil in cylinder 44 regardless of variations in traction.

The dolly

Figure 9:
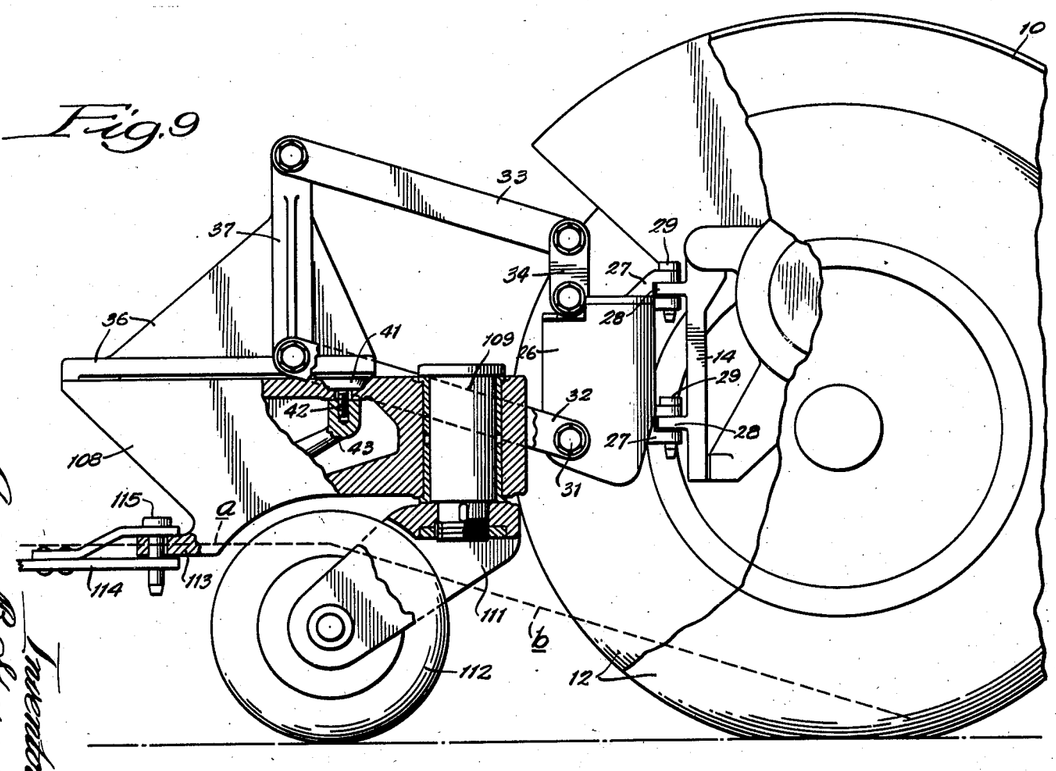
Figure 9 is a side view with parts broken away and in section of the dolly.

Figure 9 illustrates a dolly adapted to be attached to the connecting frame 36 for drawing loads through a single draft connection without interrupting the balance of the tractor. The dolly, as shown, comprises a frame or body 108 formed with conical sockets for connection with the projections 41 on the frame 36. The body 108 carries a vertical swivel pin 109 having a fork 111 at its lower end which rotatably carries a ground engaging wheel 112. The pin 109 is freely rotatable in the body and the wheel is off-set as shown so that it will caster to follow the tractor. At the rear of the frame a connector boss 113 is provided adapted to be connected to a clevis 114 by a pin 115. The clevis 114 may be connected to any desired load to be drawn such, for example, as a harrow, a wagon or the like.

The connector projection 113 may be so located on the body 108 that the line of force therefrom will pass through the point of contact of the wheels 12 with the ground or above or below such point as desired. As shown, the connector 113 is so located that the line of force therefrom will pass above the point of contact of the wheels with the ground to create a controlled couple acting to increase the effective weight on the driving wheels. Due to the upward force of the ground on the dolly wheel this line of force will be divided into two components, one as indicated at $a$, extending from the load through the connector 113 to a vertical line through the wheel and the other $b$, extending from there parallel to the links 32 and 33. The component $b$ which is the effective force on the tractor will remain substantially the same regardless of the angle of the component $a$ so that loads of varying heights can be drawn without materialy affecting the balance of the tractor.

With this dolly construction the tractor may be utilized for general pulling purposes regardless of ground contours without adversely affecting its balance as with a conventional connection. Thus, the utility of the tractor is very much increased and it may be made to serve general draft purposes with the addition only of the simple dolly construction illustrated.

The front mounting

Figure 10:
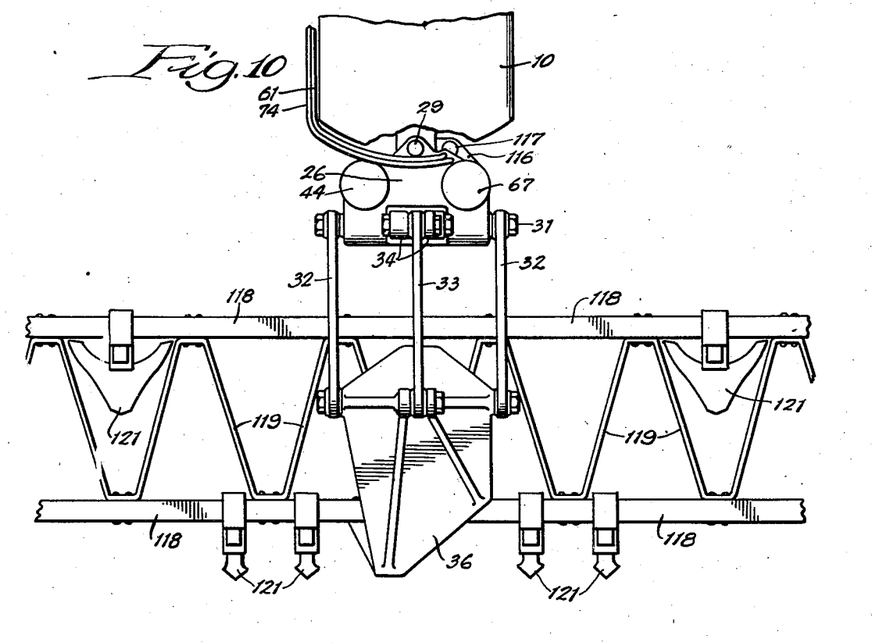
Figure 10 is a partial plan view showing a cultivator connected to the front of a tractor.

It may be desirable under some conditions as, for example, with the operation of cultivators, to mount the implement at the front of the tractor where it may be more readily observed by the operator. Such an installation is shown in Figure 10 in which the head 26 is connected to mounting lugs 28' carried by the front end of the tractor to receive the yokes on the head 26. For use on the front of the tractor pivotal movement of the head is undesirable and the head may, therefore, be provided with a flange 116 for cooperation with a mating flange on the front of the tractor and having a hole therein to receive a pin 117. In this way, the head is prevented from pivotal movement on the front of the tractor so that an implement carried thereby must always move with the tractor.

The connector frame 36 is shown as carrying a cultivator mechanism comprising a pair of cross beams 118 connected by a framework 119 and carrying a series of plows 121. The frame 118—119 is formed with sockets on its upper surface to receive the conical projections 41 on the frame 36 so that the cultivator is securely attached to the coupling means.

The mounting for the head at the front of the tractor is preferably at a higher level than the rear mounting as shown in Figure 2 so that the links will slope downwardly away from the tractor. The implement load will, therefore, tend to move the links further down, this movement being limited by the hydraulic mechanism to control the implement depth.

In operating this construction, the cultivator may be raised and lowered by the same control mechanism as described above in connection with the plow. With the implement at the front of the tractor, the top link 33 will be placed under tension instead of compression but the automatic control system is still operative since this reversal of forces only reverses the direction of motion of the arm 76 to move the opposite one of the pistons 69 or 71. Since, however, the other piston is held against inward movement by the shoulder 68 the pressure in the line 74 will be increased in the same manner as when the link 73 is under compression so that the control will be effected in exactly the same way. Furthermore, since the pump and control mechanism are connected to the head by the flexible conduits 61 and 74, the head may easily be shifted from the front to the rear of the tractor.

While the invention has been described in detail in connection with one particular embodiment, it will be understood that its scope is not limited thereto nor otherwise by the limitations of the appended claims.

What is claimed is:

1. In combination with a tractor having ground engaging drive means and power means for driving said drive means, coupling means for connecting the tractor to a load comprising upper and lower links pivotally connected at one end to the tractor for vertical and horizontal swinging movement, a frame pivotally connected to the opposite ends of the links about horizontal pivots and having the load applied thereto, the links being of substantially equal length and lying substantially parallel and cooperating with the frame to produce a line of force between the tractor and the load lying parallel to the links at a substantially constant distance from the point of engagement of the driving means with the ground in all angular positions of the links.

2. Coupling means for connecting a tractor to a load comprising upper and lower links pivotally connected at one end to the tractor for vertical swinging movement, a frame pivotally connected to the opposite ends of the links, means rigidly connected to the frame for connecting it to the load so that the resistance force of the load will be transmitted to the tractor in a line below the lines of the links, the links being of substantially equal length and lying substantially parallel to produce a line of force between the tractor and load parallel to the links and passing closely adjacent to the point of traction of the tractor.

3. Coupling means for connecting a tractor to a load comprising upper and lower links pivotally connected to the tractor for vertical swinging movement, the links being of substantially equal length, a frame having vertically spaced pivotal connections to the other ends of the links so spaced that the links will lie substantially parallel in all angular positions, conical fastening means on the frame for cooperation with complementary fastening means on an implement, and means associated with the conical fastening means detachably to connect an implement to the frame.

4. In combination with a tractor having ground engaging drive means and power means for driving said drive means, coupling means for connecting the tractor to a load comprising upper and lower links pivotally connected to the tractor for vertical swinging movement, the links being of substantially equal length, a frame having vertically spaced pivotal connections to the other ends of the links so spaced that the links will lie substantially parallel in all angular positions, a ground wheel carried by the frame and engageable with the ground to carry downward forces on the frame, means on the frame for connecting it to a load, the links and the frames being so constructed and arranged that the line of force from the connecting means to the tractor will be substantially parallel to the links and will pass through a point at a substantially constant distance from the point of engagement of the driving means with the ground in all angular positions of the links.

5. Coupling means for connecting a tractor to a load comprising upper and lower links pivotally connected to the tractor for vertical swinging movement, the links being of substantially equal length, a frame having vertically spaced pivotal connections to the other ends of the links so spaced that the links will lie substantially parallel in all angular positions, and a ground wheel carried by the frame and engageable with the ground to carry downward forces on the frame, the ground wheel being of such size and so connected to the frame as to elevate the frame ends of the links above the tractor ends of the links.

6. Coupling means for connecting a tractor to a load comprising upper and lower links pivotally connected to the tractor for vertical swinging movement, the links being of substantially equal length, a frame having vertically spaced pivotal connections to the other ends of the links so spaced that the links will lie substantially parallel in all angular positions, a ground wheel carried by the frame and engageable with the ground to carry downward forces on the frame, the ground wheel being of such size and so connected to the frame as to elevate the frame ends of the links above the tractor ends of the links, and means on the frame for connection to a load, said means being so located that a line therefrom parallel to the links will pass through the traction point of the tractor.

7. Coupling means for connecting a tractor to a load comprising upper and lower links pivotally connected at one end to the tractor for vertical swinging movement, a frame pivotally connected to the other ends of the links about horizontal pivots, a ground wheel carried by the frame and engageable with the ground to carry downward force on the frame, means on the frame for connecting it to a load, the links being so constructed and arranged as to provide a downward line of draft from the frame to the tractor and the connecting means being so located on the frame that the line of draft therefrom passes through the traction point of the tractor.

8. Coupling means for connecting a tractor to an implement comprising a lower link, an upper link, means pivotally connecting one end of each of the links to the tractor, the connecting means being so constructed as to provide for longitudinal movement of one of the links in either direction from normal, a frame pivotally connected to the other ends of the links and adapted to be connected to the implement, and means actuated by movement of said one of the links in either direction from normal under either tension or compression to control the angular position of the links relative to the tractor.

9. Coupling means for connecting a tractor to an implement comprising a lower link, an upper link, means pivotally connecting one end of each of the links to the tractor, the connecting means being so constructed as to provide for longitudinal movement of one of the links in either direction from normal, a frame pivotally connected to the other ends of the links and adapted to be connected to the implement, hydraulic means to adjust the angular position of the links relative to the tractor, a control valve for the hydraulic means, and means actuated by movement of said one of the links in either direction from normal under either tension or compression to control the control valve.

10. Coupling means for connecting a tractor to an implement comprising a lower link, an upper link, means pivotally connecting one end of each of the links to the tractor, the connecting means being so constructed as to provide for longitudinal movement of one of the links in either direction from normal, a frame pivotally connected to the other ends of the links and adapted to be connected to the implement, hydraulic means to adjust the angular position of the links relative to the tractor, a normally open control valve for the hydraulic means, and means actuated by a predetermined force either tension or compression on said one of the links tending to move it in either direction to close the valve.

11. Coupling means for connecting a tractor to an implement comprising a lower link, an upper link, means pivotally connecting one end of each of the links to the tractor, the connecting means being so constructed as to provide for longitudinal movement of one of the links in either direction from normal, a frame pivotally connected to the other ends of the links and adapted to be connected to the implement, hydraulic means connected to the links to raise them about their pivotal connections to the tractor, the links being free at all times to raise but limited in their downward movement by the hydraulic means, a valve to control the hydraulic means, and means actuated by longitudinal movement of said one of the links to control the valve so that it will be closed when the force on the link exceeds a predetermined value and will be open when the force is less than said value.

12. Coupling means for connecting a tractor to an implement comprising a lower link, an upper link, means pivotally connecting one end of each of the links to the tractor, the connecting means being so constructed as to provide for longitudinal movement of one of the links in either direction from normal, a frame pivotally connected to the other ends of the links and adapted to be connected to the implement, means connected to the links to control the pivotal position thereof, a control member for the last-named means, fluid pressure responsive means for actuating the control member, a fluid pump unit connected to the pressure responsive means, and a connection between the pump unit and said one of the links to operate the pump unit when the link is moved longitudinally.

13. Coupling means for connecting a tractor to an implement comprising a lower link, an upper link, means pivotally connecting one end of each of the links to the tractor, the connecting means being so constructed as to provide for longitudinal movement of one of the links in either direction from normal, a frame pivotally connected to the other ends of the links and adapted to be connected to the implement, hydraulic means connected to the links to control the pivotal position thereof, a control valve for the hydraulic means, fluid pressure responsive means to actuate the control valve, a fluid pump connected to the pressure responsive means, and a connection between the pump and said one of the links to operate the pump when the link is moved longitudinally.

14. Coupling means for connecting a tractor to an implement comprising a lower link, an upper link, means pivotally connecting one end of each of the links to the tractor, the connecting means being so constructed as to provide for longitudinal movement of one of the links in either direction from normal, a frame pivotally connected to the other ends of the links and adapted to be connected to the implement, hydraulic means connected to the links to control the pivotal position thereof, a control valve for the hydraulic means, fluid pressure responsive means to actuate the control valve, a fluid pump including a cylinder having a pair of pistons mounted therein and interengaging means on the pistons and cylinder to limit inward movement of the pistons, means connecting the opposite ends of the cylinder to the pressure responsive means, and an arm lying between the pistons and connected to said one of the links to move one or the other of the pistons outwardly in the cylinder as the link moves in one direction or the other.

15. Coupling means for connecting a tractor to an implement comprising a lower link, an upper link, means pivotally connecting one end of each of the links to the tractor, the connecting means being so constructed as to provide for longitudinal movement of one of the links in either direction from normal, a frame pivotally connected to the other ends of the links and adapted to be connected to the implement, means to control the pivotal position of the links relative to the tractor, a control member for said means, a fluid pressure responsive element for operating the control member, a fluid pump including a cylinder having a pair of pistons mounted therein and interengaging means on the pistons and cylinder to limit inward movement of the pistons, means connecting the opposite ends of the cylinder to the pressure responsive means, and an arm lying between the pistons and connected to said one of the links to move one or the other of the pistons outwardly in the cylinder as the link moves in one direction or the other.

16. Coupling means for connecting a tractor to an implement comprising linkage pivoted to the tractor at one end and adapted to be connected to the implement at its opposite end, a fluid motor connected to the linkage to adjust its pivotal position relative to the tractor, a discharge conduit for the fluid motor, a valve in the discharge conduit, a pump for supplying fluid to the motor, an operating member for the pump, and means on the operating member to engage and move the valve when the operating member is in one position.

17. Coupling means for connecting a tractor to an implement comprising linkage pivoted to the tractor at one end and adapted to be connected to the implement at its opposite end, a fluid motor connected to the linkage to adjust its pivotal position relative to the tractor, a discharge conduit for the fluid motor, a valve in the discharge conduit, yielding means normally urging the valve closed, an operating member for the pump oscillatable between two extreme positions, and a part on the operating member to engage the valve and open it when the operating member is in one of its extreme positions.

18. Coupling means for connecting a tractor to an implement comprising linkage pivoted to the tractor at one end and adapted to be connected to the implement at its opposite end, a fluid motor connected to the linkage to adjust its pivotal position relative to the tractor, a discharge conduit for the fluid motor, an automatic valve in the discharge conduit, means responsive to the load on the linkage to control the automatic valve, a normally closed cut-off valve in the discharge conduit, an oscillatable operating member for the pump, and a part on the operating member engageable with the cut-off valve to open it when the operating member is in one position.

19. Coupling means for a tractor having a clutch for interrupting its tractive force comprising linkage pivotally connected to the tractor and adapted to connect the tractor to a load, a fluid pump connected to the linkage to produce a fluid pressure proportional to the load on the linkage, a pressure responsive element connected to the pump, and means operated by said element to disengage the clutch when the pressure exceeds a predetermined value.

20. Coupling means for a tractor having a clutch for interrupting its tractive force comprising linkage pivotally connected to the tractor and adapted to connect the tractor to a load, an implement connected to the linkage, means to adjust the angle of the linkage to the tractor thereby to adjust the elevation of the implement, control means responsive to the load on the linkage for controlling the last-named means, and a safety device responsive to the load on the linkage to disconnect the clutch when the load exceeds a predetermined value.

21. Coupling means for a tractor having a clutch for interrupting its tractive force comprising linkage pivotally connected to the tractor and adapted to connect the tractor to a load, an implement connected to the linkage, means to adjust the angle of the linkage to the tractor thereby to adjust the elevation of the implement, a fluid pump connected to the linkage to produce a pressure proportional to the load on the linkage, means responsive to the pressure to control the last-named means, and means responsive to the pressure to disconnect the clutch when the pressure exceeds a predetermined value.

22. In combination with a tractor having fastening means thereon, a head carried by the fastening means, upper and lower links pivoted to the head about vertically spaced horizontal pivots, a frame pivotally connected to the outer ends of the links, a fluid motor on the head connected to one of the links to move the links vertically, control means for the motor on the tractor including a pump to supply operating fluid to the motor, and a flexible conduit connecting the control means to the motor.

23. In combination with a tractor having fastening means thereon, a head carried by the fastening means, upper and lower links pivoted to the head about vertically spaced horizontal pivots, a frame pivotally connected to the outer ends of the links, a fluid motor on the head connected to the links to move them vertically, a fluid pressure unit connected to the linkage to produce a pressure proportional to the load on the linkage, a pump on the tractor, a flexible conduit connecting the pump to the motor, a pressure responsive control unit on the tractor to control the motor, and a flexible conduit connecting the control unit to the fluid pressure unit.

24. For use with a tractor having mounting means on both its front and its rear, coupling means comprising a head having mounting means thereon for detachable connection to either of the mounting means on the tractor, upper and lower links pivoted to the head for swinging about horizontal pivots, a frame pivoted to the outer ends of the links about horizontal pivots, and mounting means on the frame for securing a ground engaging part thereto.

25. In combination with a tractor having driving wheels engaging the ground, coupling means for connecting the tractor to a load comprising upper and lower links pivotally connected to the tractor about horizontal pivots, the links being of substantially the same length and lying substantially parallel, a frame pivoted to the outer ends of the links about horizontal pivots and adapted to be connected to the load, the links causing the line of force of the load to lie substantially parallel thereto and being so constructed and arranged as to cause the line of force to lie in such a position as to provide optimum traction conditions for the tractor at a substantially constant distance from the point of engagement of the driving wheels with the ground regardless of the angle of the links.

26. In combination with a tractor having driving wheels engaging the ground, coupling means for connecting the tractor to a load comprising upper and lower links pivotally connected to the tractor about horizontal pivots, the links being of substantially the same length and lying substantially parallel, a frame pivoted to the outer ends of the links about horizontal pivots and adapted to be connected to the load, the links causing the line of force of the load to lie substantially parallel thereto and being so constructed and arranged as to cause the line of force to pass the center plane of the wheels spaced vertically from the point of engagement of the wheels with the ground in a direction to increase the downward pressure on the wheels, and means responsive to the load on the links to disconnect the wheels from the driving motor when the load exceeds a predetermined value.

27. In a tractor having coupling means terminating in a flat connector plate, an implement comprising a frame having a flat top formed with fastening means for connection to the lower surface of the plate, and a ground engaging part carried by the lower part of the frame.

28. Coupling means for a tractor comprising a head carried by the tractor, upper and lower links, means pivotally connecting one of the links to the head, an arm pivoted to the head and lying substantially at a right angle to the other link and pivoted at its free end to the other link, a frame pivotally connected to the outer ends of the links and adapted to carry a ground engaging part, and means responsive to pivotal movement of the arm to control the angular position of the links on the head.

29. Coupling means for a tractor comprising a head carried by the tractor, upper and lower links, means pivotally connecting one of the links to the head, an arm pivoted to the head and lying substantially at a right angle to the other link and pivoted at its free end to the other link, a frame pivotally connected to the outer ends of the links and adapted to carry a ground engaging part, a motor connected to said one of the links to move it about its pivot, and means responsive to pivotal movement of the arm to control the motor.

30. Coupling means for a tractor comprising a head carried by the tractor, upper and lower links, means pivotally connecting one of the links to the head, an arm pivoted to the head and lying substantially at a right angle to the other link and pivoted at its free end to the other link, a frame pivotally connected to the outer ends of the links and adapted to carry a ground engaging part, a hydraulic motor connected to said one of the links to move it about its pivotal connection to the head, a valve to control the hydraulic motor, and means responsive to pivotal movement of the arm to control the valve.

31. For use with a tractor having mounting means on both its front and its rear, coupling means comprising a head having mounting means thereon for detachable connection to either of the mounting means on the tractor, upper and lower links pivoted to the head for vertical swinging movement, an implement pivoted to the opposite ends of the links about vertically spaced pivots, and means on the head connected to the links for swinging them in a direction to raise the implement.

32. For use with a tractor having mounting means on both its front and its rear, coupling means comprising a head having mounting means thereon for detachable connection to either of the mounting means on the tractor, upper and lower substantially parallel links pivoted to the head about horizontal pivots, and a frame pivoted to the outer ends of the links to carry an implement, the mounting means on the front end of the tractor being at a higher level than the mounting means at the rear whereby the links will lie at a different angle when the head is mounted on the front than on the rear of the tractor.

33. For use with a tractor having mounting means on both its front and its rear, coupling means comprising a head having mounting means thereon for detachable connection to either of the mounting means on the tractor, upper and lower substantially parallel links pivoted to the head about horizontal pivots, a frame pivoted to the outer ends of the links to carry an implement, the mounting means on the front end of the tractor being at a higher level than the mounting means at the rear whereby the links will lie at a different angle when the head is mounted on the front than on the rear of the tractor, means in the head to limit downward movement of the links, and means in the head responsive to the load on the links to control the last named means.

34. Coupling means for a tractor comprising a head adapted to be mounted on the tractor, links pivoted to the head and adapted to be connected to an implement, a fluid motor in the head connected to the links to control the pivotal position thereof, a fluid pressure unit in the head connected to the links to produce a pressure proportional to the load on the links, and means responsive to said pressure to control the motor.

35. Coupling means for a tractor comprising a head adapted to be mounted on the tractor, links pivoted to the head about horizontal pivots and adapted to be connected to an implement, means in the head for limiting downward swinging movement of the links, and means in the head connected to the links and responsive to the load thereon to control the last named means.

36. Coupling means for a tractor comprising upper and lower links pivoted at one end to the tractor about horizontal pivots and adapted to be connected at their other end to an implement, a fluid motor connected to the links to control the vertical position thereof about their pivotal connection to the tractor, control means for the motor, fluid pressure means for operating the control means, and a fluid pressure element connected to the links to create a fluid pressure responsive to the load thereon and connected to said fluid pressure means to supply actuating fluid thereto.

37. Coupling means for a tractor comprising upper and lower links pivoted at one end to the tractor about horizontal pivots and adapted to be connected at their other end to an implement, a fluid motor connected to the links to control the vertical position thereof about their pivotal connection to the tractor, control means for the motor, and a closed fluid system for operating the control means including a fluid actuated member connected to the control means and a pressure producing unit connected to the links for producing a pressure in the system proportional to the load on the links.

38. Coupling means for a tractor comprising upper and lower links pivotally connected to the tractor about vertically spaced horizontal pivots, a frame pivotally connected to the outer ends of the links about vertically spaced horizontal pivots, the frame having a flat connector plate, an implement having a flat connector plate and a ground engaging part rigidly connected thereto, and a plurality of spaced detachable fastening means on the connector plates rigidly to secure them together.

GEORGE B. SHERMAN.